US008803975B2

(12) United States Patent
Haupt et al.

(10) Patent No.: US 8,803,975 B2
(45) Date of Patent: Aug. 12, 2014

(54) INTERACTIVE SYSTEM FOR RECOGNITION ANALYSIS OF MULTIPLE STREAMS OF VIDEO

(75) Inventors: Gordon T. Haupt, San Francisco, CA (US); J. Andrew Freeman, San Jose, CA (US); Stephen D. Fleischer, San Francisco, CA (US); Robert P. Vallone, Palo Alto, CA (US); Stephen G. Russell, San Francisco, CA (US); Timothy B. Frederick, San Francisco, CA (US)

(73) Assignee: 3VR Security, Inc., San Francisco, CA (US)

( * ) Notice: Subject to any disclaimer, the term of this patent is extended or adjusted under 35 U.S.C. 154(b) by 960 days.

(21) Appl. No.: 12/261,554

(22) Filed: Oct. 30, 2008

(65) Prior Publication Data
US 2009/0074261 A1    Mar. 19, 2009

Related U.S. Application Data

(60) Division of application No. 11/081,753, filed on Mar. 15, 2005, now Pat. No. 7,529,411, which is a continuation-in-part of application No. 10/965,687, filed on Oct. 13, 2004, now Pat. No. 7,697,026.

(60) Provisional application No. 60/554,050, filed on Mar. 16, 2004.

(51) Int. Cl.
| H04N 7/18 | (2006.01) |
| G06K 9/00 | (2006.01) |
| G06K 9/68 | (2006.01) |
| G06K 9/70 | (2006.01) |
| G06K 9/62 | (2006.01) |
| G06K 9/74 | (2006.01) |

(52) U.S. Cl.
CPC ........ G06K 9/00288 (2013.01); G06K 9/00268 (2013.01); H04N 7/181 (2013.01)
USPC ............ 348/161; 382/118; 382/227; 382/228

(58) Field of Classification Search
CPC   G06K 9/00288; G06K 9/00268; H04N 7/181
USPC .......... 348/156, 161, 169–170; 382/118, 218, 382/220, 226–228
See application file for complete search history.

(56) References Cited

U.S. PATENT DOCUMENTS

| 4,850,027 A | 7/1989 | Kimmel |
| 5,073,950 A | 12/1991 | Colbert et al. |

(Continued)

FOREIGN PATENT DOCUMENTS

| EP | 0 947 963 A1 | 6/1999 |
| WO | WO 03/047258 A1 | 6/2003 |

OTHER PUBLICATIONS

U.S. Appl. No. 11/398,158, filed Apr. 4, 2006, Notice of Allowance, Nov. 16, 2009.

(Continued)

*Primary Examiner* — Rupal Dharia
*Assistant Examiner* — Wing Ma
(74) *Attorney, Agent, or Firm* — Hickman Palermo Truong Becker Bingham Wong LLP

(57) ABSTRACT

A method of identifying an object captured in a video image in a multi-camera video surveillance system is disclosed. Sets of identifying information are stored in profiles, each profile being associated with one object. The disclosed method of identifying an object includes comparing identifying information extracted from images captured by the video surveillance system to one or more stored profiles. A confidence score is calculated for each comparison and used to determine a best match between the extracted set of identifying information and an object. In one embodiment, the method is used as part of a facial recognition system incorporated into a video surveillance system.

34 Claims, 6 Drawing Sheets

(56) References Cited

U.S. PATENT DOCUMENTS

| | | | |
|---|---|---|---|
| 5,077,805 A | 12/1991 | Tan | |
| 5,251,269 A * | 10/1993 | Korner et al. | 382/158 |
| 5,450,504 A * | 9/1995 | Calia | 382/118 |
| 5,539,454 A | 7/1996 | Williams | |
| 5,715,325 A | 2/1998 | Bang et al. | |
| 5,771,307 A * | 6/1998 | Lu et al. | 382/116 |
| 5,842,194 A * | 11/1998 | Arbuckle | 706/52 |
| 5,844,991 A | 12/1998 | Hochberg et al. | |
| 5,850,470 A | 12/1998 | Kung et al. | |
| 5,862,342 A | 1/1999 | Winter et al. | |
| 5,875,304 A | 2/1999 | Winter et al. | |
| 6,031,573 A | 2/2000 | MacCormack et al. | |
| 6,038,333 A | 3/2000 | Wang | |
| 6,091,836 A * | 7/2000 | Takano et al. | 382/118 |
| 6,097,429 A | 8/2000 | Seeley et al. | |
| 6,144,797 A | 11/2000 | MacCormack et al. | |
| 6,154,133 A | 11/2000 | Ross et al. | |
| 6,181,806 B1 | 1/2001 | Kado et al. | |
| 6,184,926 B1 | 2/2001 | Khosravi et al. | |
| 6,188,381 B1 | 2/2001 | Van der Wal et al. | |
| 6,285,995 B1 | 9/2001 | Abdel-Mottaleb et al. | |
| 6,476,858 B1 | 11/2002 | Ramirez Diaz et al. | |
| 6,542,075 B2 | 4/2003 | Barker et al. | |
| 6,549,913 B1 * | 4/2003 | Murakawa | 1/1 |
| 6,606,398 B2 * | 8/2003 | Cooper | 382/118 |
| 6,608,914 B1 * | 8/2003 | Yamaguchi et al. | 382/118 |
| 6,636,222 B1 | 10/2003 | Valmiki et al. | |
| 6,646,676 B1 | 11/2003 | DaGraca et al. | |
| 6,704,466 B1 * | 3/2004 | Yamamoto et al. | 382/305 |
| 6,725,383 B2 * | 4/2004 | Kyle | 726/7 |
| 6,754,389 B1 | 6/2004 | Dimitrova et al. | |
| 6,791,603 B2 | 9/2004 | Lazo et al. | |
| 6,842,540 B1 | 1/2005 | Okayama et al. | |
| 6,999,613 B2 | 2/2006 | Colmenarez et al. | |
| 7,016,532 B2 | 3/2006 | Boncyk et al. | |
| 7,068,723 B2 | 6/2006 | Foote et al. | |
| 7,298,895 B2 | 11/2007 | Loui et al. | |
| 7,310,442 B2 | 12/2007 | Monachino et al. | |
| 7,337,127 B1 | 2/2008 | Smith et al. | |
| 7,421,097 B2 | 9/2008 | Hamza et al. | |
| 7,450,735 B1 | 11/2008 | Shah et al. | |
| 7,558,408 B1 * | 7/2009 | Steinberg et al. | 382/118 |
| 2002/0030738 A1 | 3/2002 | Moreinis et al. | |
| 2002/0103776 A1 * | 8/2002 | Bella et al. | 706/49 |
| 2002/0136434 A1 * | 9/2002 | Kuroda et al. | 382/118 |
| 2002/0176610 A1 * | 11/2002 | Okazaki et al. | 382/118 |
| 2002/0196327 A1 | 12/2002 | Rui et al. | |
| 2003/0086496 A1 | 5/2003 | Zhang et al. | |
| 2003/0123713 A1 | 7/2003 | Geng | |
| 2003/0210808 A1 * | 11/2003 | Chen et al. | 382/118 |
| 2003/0217294 A1 * | 11/2003 | Kyle | 713/202 |
| 2004/0001142 A1 | 1/2004 | Kumhyr | |
| 2004/0001615 A1 | 1/2004 | Philomin et al. | |
| 2004/0008258 A1 | 1/2004 | Aas et al. | |
| 2004/0008873 A1 | 1/2004 | Sogo et al. | |
| 2004/0028391 A1 | 2/2004 | Black et al. | |
| 2004/0042643 A1 | 3/2004 | Yeh | |
| 2004/0073543 A1 * | 4/2004 | Kim et al. | 707/3 |
| 2004/0078260 A1 | 4/2004 | Milgramm et al. | |
| 2004/0080615 A1 | 4/2004 | Klein et al. | |
| 2004/0086093 A1 | 5/2004 | Schranz | |
| 2004/0086157 A1 * | 5/2004 | Sukegawa | 382/115 |
| 2004/0095236 A1 | 5/2004 | Sobol | |
| 2004/0117638 A1 | 6/2004 | Monroe | |
| 2004/0130620 A1 | 7/2004 | Buehler et al. | |
| 2004/0161133 A1 | 8/2004 | Elazar et al. | |
| 2004/0183667 A1 | 9/2004 | Nicoletti et al. | |
| 2004/0197013 A1 * | 10/2004 | Kamei | 382/118 |
| 2004/0247177 A1 * | 12/2004 | Rowe et al. | 382/159 |
| 2004/0264780 A1 * | 12/2004 | Zhang et al. | 382/224 |
| 2005/0232462 A1 | 10/2005 | Vallone et al. | |
| 2006/0066722 A1 | 3/2006 | Yin et al. | |
| 2009/0196464 A1 * | 8/2009 | Dimitrova et al. | 382/118 |

OTHER PUBLICATIONS

Bolle, R. et al., "Guide to Biometrics" XP-002335642; *Springer* (2003) pp. 145, 159-161 and 169-170.

Gong, S. et al., "Dynamic Vision: from Images to Face Recognition" XP-002335641; *Imperial Press* (2000) p. 16 and pp. 276-293.

Okada, K. et al., "Automatic Video Indexing with Incremental Gallery Creation: Integration of Recognition and Knowledge Acquisition" *IEEE* (1999) pp. 431-434.

"Notification of Transmittal of the International Search Report and the Written Opinion of the International Searching Authority, or the Declaration" received in PCT International application No. PCT/US2005/008655 dated Jul. 13, 2005 (13 pages).

"Notification of Transmittal of the International Preliminary Report on Patentability" received in International application No. PCT/US2005/008655 dated Jun. 28, 2006 (7 pages).

"Written Opinion of the International Preliminary Examining Authority" received in related International application No. PCT/US2005/008655 dated Apr. 25, 2006 (5 pages).

Current claims of PCT/US2005/008655, Jan. 20, 2009 (10 pages).

"Notification of Transmittal of the International Search Report and the Written Opinion of the International Searching Authority, or the Declaration" in related PCT case, International application No. PCT/US2005/008735 dated Sep. 5, 2005 (18 pages).

"Notification of Transmittal of the International Preliminary Report on Patentability" received in International application No. PCT/US2005/008735 dated Jul. 17, 2006 (16 pages).

Current claims of PCT/US2005/008735, Jan. 20, 2009 (7 pages).

Javed, O. et al., "Tracking Across Multiple Cameras with Disjoint Views" Proceedings of the Ninth IEEE International Conference on Computer Vision, 2003 IEEE (6 pages).

U.S. Appl. No. 11/398,159, filed Apr. 4, 2006, Office Action, Jul. 19, 2011.

Canadian Office Action received in Application No. 2,559,381 dated Feb. 10, 2012 (2 pages).

Current Claims in Application No. 2,559,381 dated Feb. 2012 (9 pages).

\* cited by examiner

INTERACTIVE SYSTEM FOR RECOGNITION ANALYSIS OF MULTIPLE STREAMS OF VIDEO

PRIORITY CLAIM

This application is a divisional of U.S. patent application Ser. No. 11/081,753, filed Mar. 15, 2005 now U.S. Pat. No. 7,529,411, which is incorporated herein by reference as if fully set forth herein, under 35 U.S.C. §120; which claims (a) the benefit of priority to U.S. Provisional Patent Application No. 60/554,050 filed on Mar. 16, 2004, entitled "Video Intelligence Platform"; and (b) the benefit of priority to and is a continuation-in-part of U.S. patent application Ser. No. 10/965,687, entitled PIPELINE ARCHITECTURE FOR ANALYZING MULTIPLE VIDEO STREAMS, filed on Oct. 13, 2004 now U.S. Pat. No. 7,697,026, the contents of which are herein incorporated by reference in their entirety for all purposes.

FIELD OF THE INVENTION

The present invention relates to recognizing or identifying objects from images taken in naturalistic environments and, more specifically, to a system that improves accuracy in facial recognition by allowing a user to correct and update selections made by a facial recognition module such that multiple sets of identifying information can be associated with a single person and used by the facial recognition module to improve future matching.

BACKGROUND

"Biometrics" refers to unique physiological and/or behavioral characteristics of a person that can be measured or identified. Example characteristics include height, weight, fingerprints, retina patterns, skin and hair color, and voice patterns. Identification systems that use biometrics are becoming increasingly important security tools. Identification systems that recognize irises, voices or fingerprints have been developed and are in use. These systems provide highly reliable identification, but require special equipment to read the intended biometric (e.g., fingerprint pad, eye scanner, etc.) Because of the expense of providing special equipment for gathering these types of biometric data, facial recognition systems requiring only a simple video camera for capturing an image of a face have also been developed.

In terms of equipment costs and user-friendliness, facial recognition systems provide many advantages that other biometric identification systems cannot. For instance, face recognition does not require direct contact with a user and is achievable from relatively far distances, unlike most other types of biometric techniques, e.g., fingerprint and retina pattern. In addition, face recognition may be combined with other image identification methods that use the same input images. For example, height and weight estimation based on comparison to known reference objects within the visual field may use the same image as face recognition, thereby providing more identification data without any extra equipment.

However, facial recognition systems can have large error rates. In order to provide the most reliable and accurate results, current facial recognition systems typically require a person who is to be identified to stand in a certain position with a consistent facial expression, facing a particular direction, in front of a known background and under optimal lighting conditions. Only by eliminating variations in the environment is it possible for facial recognition systems to reliably identify a person. Without these types of constraints in place, the accuracy rate of a facial recognition system is poor, and therefore facial recognition systems in use today are dedicated systems that are only used for recognition purposes under strictly controlled conditions.

Video surveillance is a common security technology that has been used for many years, and the equipment (i.e., video camera) used to set up a video surveillance system is inexpensive and widely available. A video surveillance system operates in a naturalistic environment, however, where conditions are always changing and variable. A surveillance system may use multiple cameras in a variety of locations, each camera fixed at a different angle, focusing on variable backgrounds and operating under different lighting conditions. Therefore, images from surveillance systems may have various side-view and/or top-view angles taken in many widely varying lighting conditions. Additionally, the expression of the human face varies constantly. Comparing facial images captured at an off-angle and in poor lighting with facial images taken at a direct angle in well lit conditions (i.e., typical images in a reference database) results in a high recognition error rate.

In a controlled environment, such as an entry vestibule with a dedicated facial recognition security camera, the comparison of a target face to a library of authorized faces is a relatively straightforward process. An image of each of the authorized individuals will have been collected using an appropriate pose in a well lighted area. The person requesting entry to the secured facility will be instructed to stand at a certain point relative to the camera, to most closely match the environment in which the images of the authorized people were collected.

For video surveillance systems, however, requiring the target individual to pose is an unrealistic restriction. Most security systems are designed to be unobtrusive, so as not to impede the normal course of business or travel, and would quickly become unusable if each person traveling through an area were required to stop and pose. Furthermore, video surveillance systems frequently use multiple cameras to cover multiple areas and especially multiple entry points to a secure area. Thus, the target image may be obtained under various conditions, and will generally not correspond directly to the pose and orientation of the images in a library of images.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS OF THE INVENTION

Techniques are provided for improving accuracy of an object recognition system in a naturalistic environment. These techniques may be used, for example, for providing accurate facial recognition in a video surveillance system.

In one embodiment, a method is provided for determining a best match between a target profile and a set of stored profiles, where a profile contains a set of identifying information extracted from an image set associated with the profile. The method includes generating a plurality of confidence scores based on comparisons between the target profile and the set of stored profiles. The generated confidence scores are weighted using information external to the confidence scores. Based on the plurality of weighted confidence scores, a stored profile is selected as the best match for the target profile.

In one embodiment, a method for maintaining associations between profiles and objects in an object recognition system is provided. The method includes automatically creating an association between a first stored profile and a first object, and automatically creating an association between a second stored profile and the first object. Views of the image sets associated with the first and second stored profiles are provided to a user. Feedback is received from the user about the association between the second stored profile and the first object. The second stored profile's association with the first object is modified in accordance with the received feedback.

In one embodiment, a method is provided for determining a best match between a target profile and an object in an object recognition system in which each object recognized by the system is associated with a plurality of stored profiles. A profile contains a set of identifying information extracted from an image set associated with the profile. The method includes generating a plurality of confidence scores based on comparisons between the target profile and a set of stored profiles. The object associated with each generated confidence score is determined. The generated confidence scores and determined associated objects are analyzed, and the analysis is used to select a best matching object in accordance with the analyzed confidence scores and determined associated objects.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

Figure 1:
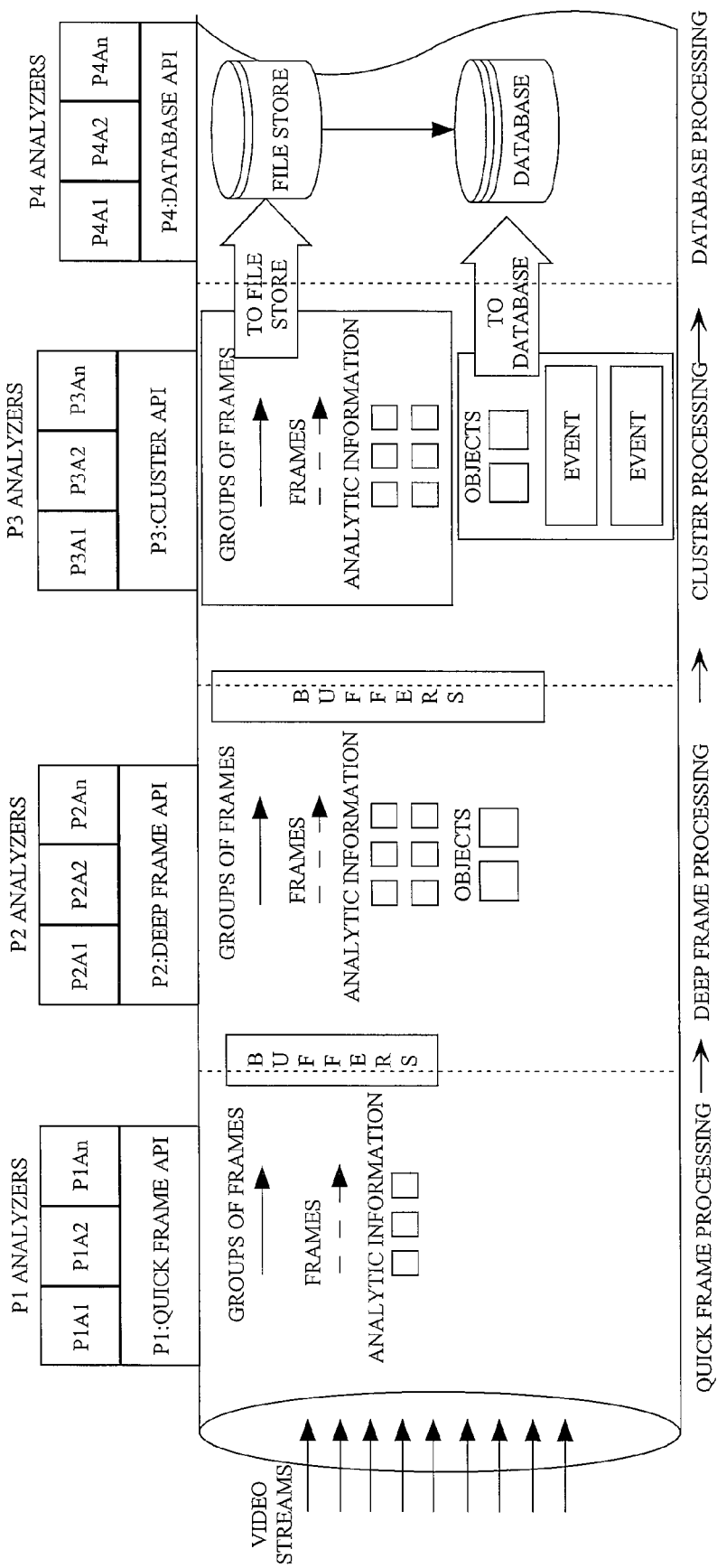
FIG. 1 is a block diagram that illustrates a multi-camera video processing pipeline architecture upon which an embodiment of the invention may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

A surveillance system that includes face recognition capabilities to identify people in the video images acquired by the surveillance system could have many important applications. For example, such a system could be used as a security system to grant or deny access to select individuals, to sound an alarm when a particular person is recognized, or to continuously track an individual as the individual travels amongst a plurality of people, and so forth.

In order to incorporate facial recognition into a video surveillance system, however, it must be possible to identify a single frame or video clip that may contain an image of a person's face, extract identifying information from the image for comparison with known faces, and reliably determine whether the extracted identifying information matches identifying information of the face of a known person. Current surveillance systems with face recognition capabilities have not successfully been able to perform each of these steps.

As discussed above, high accuracy rates for facial recognition have only been achieved in systems operating under very controlled conditions, as the accuracy of matches found by a facial recognition system dramatically decreases with changes in a subject's face orientation, changes in illumination conditions, and changes in a subject's facial expressions. These limitations mean that the use of facial recognition has been limited to access control points where a cooperative subject is standing still, facing the camera, and lighting is controlled. These fundamental restrictions prevent current face recognition systems from effectively and reliably identifying individuals in field-deployable conditions. Only if both the surveillance image and the reference image are taken from the same angle, and with consistent lighting and facial expression, is any type of significant accuracy achieved. Video surveillance systems that operate in a naturalistic environment in which subjects are not required to pose for an identification camera under controlled circumstances may have an accuracy rate so low as to make the system unusable.

Furthermore, in an image tracking system, wherein an image of a target is obtained from one scene, and then matched to images in subsequent scenes, neither the original image not the subsequent images will be obtained under ideal conditions, thereby reducing recognition accuracy rates even further.

Over time, people will routinely change hairstyles, hair color, suntan, makeup, posture, and body weight. Moreover, the facial characteristics of a person's face will change due to aging. These types of changes make it difficult for a facial recognition system to consistently identify a person correctly using an unchanging static image of a person as its reference, even if other environment variables are controlled.

A system which provides for reliable facial recognition in a multi-camera naturalistic environment, such as a surveillance system, is disclosed herein. In addition, the disclosed techniques can be used to "train" the surveillance system to more accurately identify people over time.

Embodiments of the present invention provide for using images from a multi-camera surveillance system to construct identifying information about the objects or persons regularly surveyed by the system. Significantly, the cameras in the surveillance system may be operated under different and variable lighting conditions, and with various zoom and focus settings. In a facial recognition system embodiment, the faces of people captured by the cameras in the system can be facing different directions, have various facial expressions, and will change over time. Further embodiments of the present invention may be used to recognize any type of object from images acquired by a multi-camera, naturalistic environment surveillance system.

Unlike other facial recognition systems, a surveillance system has few artificial constraints, and provides a large number of naturalistic images of people or objects over time. Embodiments of the present invention use the images from a multi-camera surveillance system to acquire a large number of naturalistic positive identifications of an object or person, and use these positive identifications to train the system to improve recognition rates.

Exemplary System

Figure 3:
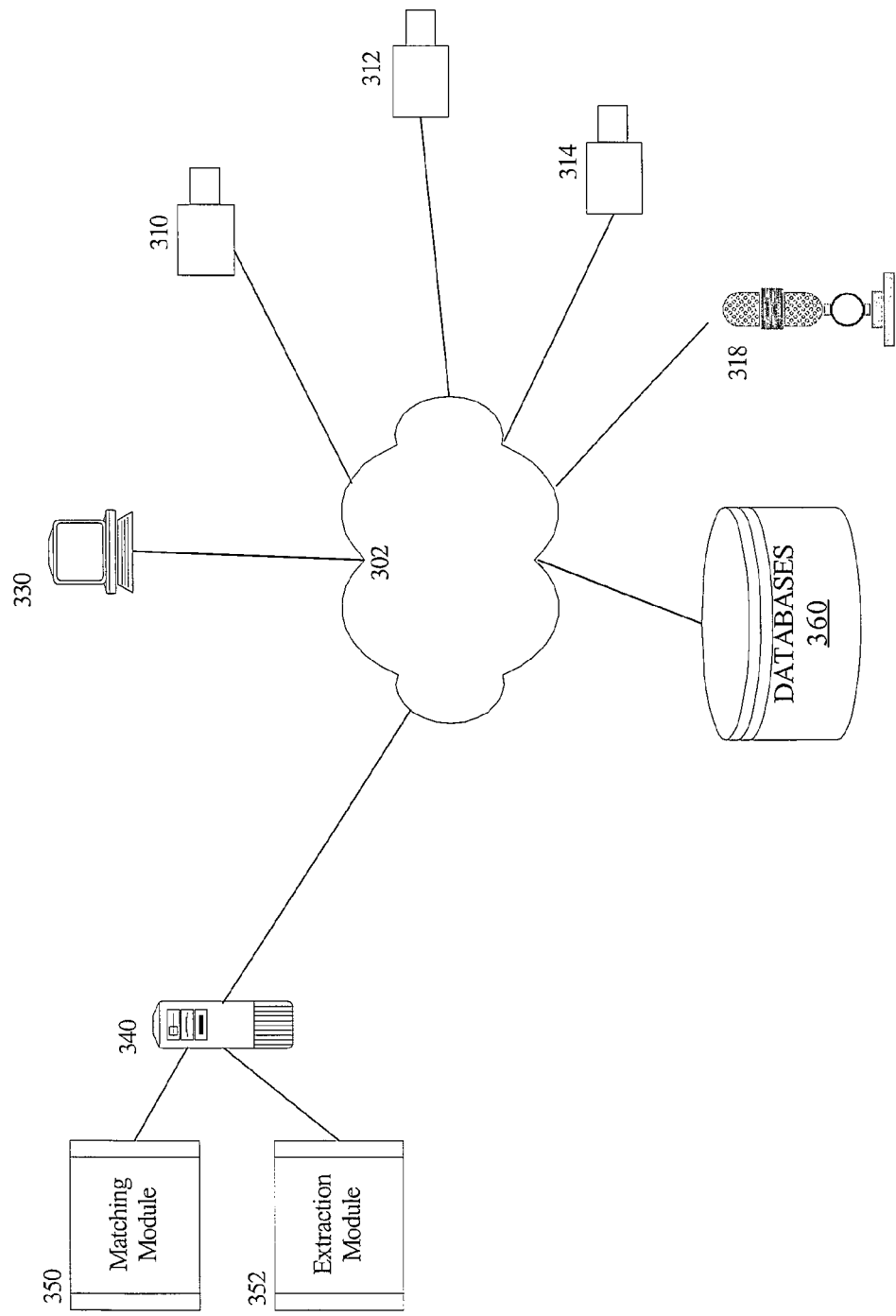
FIG. 3 is a diagram that illustrates a high-level view of a video surveillance network on which an embodiment of the invention may be implemented.

FIG. 3 illustrates a high-level pictorial representation of a video surveillance network 300 in which an embodiment of the present invention may be implemented. As shown, video cameras 310, 312, 314 are connected to network 302, as are voice recorder 318, server 340, expert user workstation 330 and storage unit 360. Network 302 is the medium used to provide communications links between various devices and computers connected together within the system. Surveillance network 302 may be implemented as any type of network, such as an intranet, a local area network (LAN), or a wide area network (WAN). The network 302 may also comprise secure connections to the Internet. Network 302 may include connections such as wire, wireless communication links, or fiber optic cables, for example. Alternatively, instead of a network, some or all of the components of the surveillance system may be directly connected to each other.

Extraction module 352 extracts identifying information from the video data produced by cameras 310, 312, 314, and/or from samples taken by voice recorder 318. Extraction module 352 may use any method known to those skilled in the art that takes raw image data and extracts identifying information. Extraction module can be a component provided by a third party that integrates with system 300.

Matching module 350 processes the extracted identifying information produced by extraction module 352 to determine if the extracted identifying information matches identifying information stored in storage unit 360. Matching module 350 may use any method known to those skilled in the art to compare extracted sets of identifying information, such as feature sets for face recognition, to stored sets of identifying information, and calculate a "confidence score." A confidence score numerically represents the similarity between target identifying information extracted by module 352 and a stored set of identifying information. Matching module 350 may also be a component provided by a third party that integrates with system 300.

As shown in FIG. 3, extraction module 352 and matching module 350 may be components of server 340. Alternatively, one or both of these modules may reside in a separate computer dedicated to performing just that module.

Video cameras 310, 312 and 314 may be any cameras used in a video surveillance system, either visible or hidden from persons surveyed by the surveillance system. Cameras 310, 312, 314 may operate in the visual range of the electromagnetic spectrum or may include other ranges including infrared (IR) and ultraviolet (UV). In addition, a camera may also have light amplification capabilities for low light conditions. Cameras 310, 312, 314 may be identical, or each may have different capabilities.

Voice recorder 318 may be used in conjunction with the images acquired by cameras 310, 312, 314 to identify a person. While shown in the example embodiment of FIG. 3, voice recorder 318 is not required. Likewise, while only one voice recorder 318 is shown in FIG. 3, any number of voice recorders could be used.

Data store 360 may contain one or more databases of video data recorded by cameras 310, 312, 314. Video data stored in data store 360 may include single frames or images, as well as video clips. Data store 360 may also include one or more databases of audio or voice samples captured by the surveillance system. In addition, data store 360 may also contain one or more reference databases of identifying information associated with objects or persons whose image was obtained by a camera in the multi-camera surveillance system. Data store 360 may contain additional databases that store surveillance system management information. Data store 360 may be one device. Alternatively, each database in data store 360 may be stored on separate storage devices in separate locations. Data store 360 is intended to include any computer that stores video data and surveillance system management information. Video data stored in the system may include video data captured by cameras in the surveillance system, or may originate outside of the surveillance system. Data store 360 is accessible by matching module 350 to compare images acquired by any camera 310, 312, 314, and identifying information extracted from these images, to identification information and images stored in a database on data store 360.

Surveillance system 300 may include additional detection means, servers, clients and other peripheral devices not shown. For example, surveillance system 300 may also include Radio Frequency identification transponders used to identify individuals or objects to which the transponder is attached. FIG. 3 is intended as an example, and not as an architectural limitation for the present invention.

Pipeline Architecture

One specific example of multi-camera architecture that could be used to implement an embodiment of the present invention is disclosed in co-pending application U.S. patent application Ser. No. 10/965,687, entitled PIPELINE ARCHITECTURE FOR ANALYZING MULTIPLE STREAMS OF VIDEO, filed on Oct. 13, 2004, the contents of which have been incorporated by reference in their entirety for all purposes. FIG. 1, taken from the referenced co-pending application, herein after referred to as the "Pipeline Application", illustrates an embodiment of the multi-camera pipeline architecture.

In the system disclosed in the co-pending Pipeline application, numerous video analysis applications can access and analyze video data that represents video streams flowing through the pipeline, and annotate portions of the video data (e.g., frames and groups of frames), based on the analyses performed, with information that describes the portion of the video data. These annotations flow through the pipeline, possibly along with corresponding frames or groups of frames, to subsequent stages of processing, at which increasingly complex analyses can be performed. Analyses performed at the various stages of the pipeline can take advantage of the analyses performed at prior stages of the pipeline through use of the information embodied in the annotations. At each stage of the pipeline, portions of the video streams determined to be of no interest to subsequent stages are removed from the video data, which reduces the processing requirements of the subsequent stages.

Ultimately, "events" are constructed and stored in a database, from which cross-event and historical analyses may be performed and associations with, and among, events may be made. Such events contain whatever information is relevant to describing the real-world activities or objects for which the event was constructed to describe. In addition, events may contain pointers to locations in persistent memory, e.g., a file store in storage unit 360 of FIG. 3, at which the associated frames and/or groups of frames are stored. Hence, from an event stored in the database, the associated frames and/or groups of frames can be replayed for further human-based or application-based analyses.

In one embodiment, the pipeline comprises four different successive stages of processing: (1) quick frame processing; (2) deep frame processing; (3) cluster processing; and (4) database processing. Due to the nature of the pipeline, applications plugged into the pipeline, via application program interfaces (APIs) associated with each respective stage, can perform increasingly more complex analyses at each successive stage of processing.

Generally, as the videos flow down the pipeline, (1) portions of the videos or frames that are considered uninteresting to all the applications at a given stage are removed, thereby reducing the amount of data that flows further down the pipeline; (2) portions of the videos or frames that are considered interesting to an application at a given stage are analyzed, with a goal of identifying features, activities, objects, etc. of interest; and (3) analyzed portions of the videos or frames are annotated by the applications with information that describes what the applications identified as interesting in that portion of the video.

Stage 1 of the pipeline processing ("P1") is referred to as "quick frame" processing. Quick frame processing is lightweight processing (i.e., not relatively resource-intensive and computationally complex) performed in real-time as the video streams flow into the pipeline. Various applications tailored to recognize and identify certain occurrences may plug into the pipeline via the quick frame API, to perform fast lightweight operations, such as noise reduction, motion detection, gross object finding (e.g., a vehicle or person), object tracking, frame area filtering, and the like.

Stage 2 of the pipeline processing ("P2") is referred to as "deep frame" processing. Any number of video analysis applications (referred to in FIG. 1 as P2 Analyzers, P2A1, P2A2, P2An) can access the video feeds from the buffers for deep frame processing, through a deep frame API. Various applications tailored to recognize and identify certain occurrences may plug into the pipeline via the deep frame API, to perform more computationally complex and resource-intensive analyses operations than with quick frame processing. For example, deep frame analyses of the video streams may include face finding, license plate recognition, complex object detection (e.g., gun finding), feature extraction, and the like.

An application to identify a frame from a camera that contains an image of a person's face may be included as a "P2" application that uses the deep frame API. Likewise, an application to extract features from faces identified in frames of surveillance video from multiple cameras (e.g., extraction module 352 of FIG. 3) may also be included as a "P2" application. When the pipeline architecture is used for face recognition, a preliminary identification of a person in a single video frame or image may also be made by an application using the P2 API.

If any P2 analyzer finds particular frames to be of interest, then the analyzer determines what type of analysis to perform on the video clip or frame, and creates "pipeline objects" based thereon. A pipeline object herein refers to a programmatic object such as an object in object-oriented programming. Pipeline objects created at the deep frame processing stage typically contain a pointer to one or more relevant frames, and additional information about the content of the frame on which the pipeline object is based. Sequences of pipeline objects are output from the deep frame processing stage and, in one embodiment, are queued in a buffer between the deep frame processing stage and the cluster processing stage.

Stage 3 of the pipeline processing ("P3") is referred to as "cluster" processing. Any number of video analysis applications (referred to in FIG. 1 as P3 Analyzers, P3A1, P3A2, P3An) can access the video feeds and other information from buffers for cluster and event processing, through a cluster API. Various applications tailored to recognize and identify certain occurrences may plug into the pipeline via the cluster API, to perform analyses on the video streams across time (i.e., across frames) and across cameras (i.e., within a "cluster" of cameras that, for analysis purposes, are treated as an entity). Events based on analyses of the video streams at the cluster stage of processing may include various tailored analyses and construction of associated events, such as person or face events, alert generation events, externally triggered events, and the like.

An event that is constructed based on video feeds from multiple cameras, i.e., a cluster of cameras, is referred to as a "cluster event." Cluster events provide information such as what happened in a building lobby rather than what happened in view of camera X, where camera X is only one of a plurality of cameras operating in the lobby.

The same video data can be used in multiple stages of processing. For example, a P2 application can be used to make a preliminary identification of a face captured in a single image or frame. Then, during P3 processing a cluster event may be created that includes the frame used to make the preliminary identification. A P3 application can be used to link multiple related images from a cluster event into an image set, and then analyze the image set to identify the person, resulting in a more reliable identification than the preliminary identification made by a P2 application.

Events, either cluster events or non-cluster events, are constructed by P3 analyzers at the cluster stage of processing, based on output by the deep frame stage of processing. Events are output from the cluster stage and stored in a database. In one embodiment, each event is embodied as a row in a database table, where each row contains (1) information that describes whatever the analyzer determined about what occurred in the area observed (i.e., the content of the video frames or video clips), for which the event was constructed, and (2) references to the frames or video clips that are associated with the event, if desired or necessary, including pointers to the frames or video clips in a file store. The P3 analyzer applications determine what information to store in the database in association with an event.

Further analysis and reasoning can be applied to events, or combinations of events, that are stored in the database. From a database record containing pointers to the location in the file store at which frames and video clips are stored, the associated frames and video clips can be replayed and reviewed, for example, by a user via a display monitor or by database stage analyzer applications via a database API.

Stage 4 of the pipeline processing ("P4") is referred to as database processing. Any number of video analysis applications (referred to in FIG. 1 as P4 Analyzers, P4A1, P4A2, P4An) can access event records from the database for database processing, through the database API. Various applications tailored to perform complex analysis across events and across clusters may plug into the pipeline via the database API, to perform analyses such as historical analyses, person/place/time reports, object identification, and the like. As discussed in more detail below, the New Object Analysis in which an expert user makes a positive identification of a person or object in a video image may be a P4 application that uses the database API.

The above-described Pipeline architecture may be used to implement embodiments of the techniques described hereafter, although as will be apparent to those skilled in the art, embodiments may be implemented in any multi-camera surveillance system, and are not limited to this architecture.

Extracting a Set of Identifying Information

The techniques disclosed herein are described using facial recognition as an example application, however, the techniques are not limited to just facial recognition. The disclosed techniques may be used to recognize and identify any object whose image is obtained in a multi-camera surveillance system, such as a weapon, suitcase, vehicle and the like. Furthermore, although the techniques are described using video cameras, it will be apparent to those skilled in the art that any camera or device used to produce a sample, such as an image, can be used. For example, voice samples may be recorded from multiple recorders and used as identification input.

Most facial recognition systems do not directly compare images to effect a recognition. Instead, each face is characterized using a predefined set of characteristic parameters, such as the ellipticity of the face, the spacing of the eyes, the shape of the chin, etc. A search for a match to a reference face is based on a comparison of these characteristic parameters instead of directly comparing images. These characteristic parameters are designed to facilitate a distinction between images of different faces, and a matching between different images of the same face. In this manner, the characteristic parameters of a target image can be compared to the characteristic parameters of a reference image.

Typically, in facial recognition systems, the set of characteristic parameters is called a "feature set." A feature set for a person's face captured in an image may contain mathematical expressions or vectors that represent various facial profile measurements or correspond to certain facial features. As is known to those skilled in the art, there are many different known types of facial feature sets that can be created, and the present invention is not limited to any one type of facial feature set. In addition, while embodiments of the present invention are described using a facial recognition system as an example, alternative embodiments of the present invention may identify non-person objects by using characteristic extraction parameters related to the type of object being identified.

In one embodiment, a "profile" contains a set of identifying information associated with a view of the object shown in an image or set of images. For example, a profile of a person may contain a feature set extracted from a view of a person's face in an image or set of images.

If a profile is created from a single image, the set of identifying information in the profile is extracted from that single image. If a profile is created from a set of multiple images, the set of identifying information in the profile may be calculated a number of ways. For example, the profile's set of identifying information may contain identifying information extracted from the image in the set of images that is determined to contain the "best" view of the object. As another example, the profile's set of identifying information may be calculated by averaging sets of identifying information extracted from each image in the image set. As another example, the profile's set of identifying information may be extracted from an image that is created by averaging the images in the image set. The profile's set of identifying information may include multiple subsets of identifying information, each subset of identifying information extracted from an individual image. Any method of extracting and calculating a set of identifying information from a set of images may be used to create the set of identifying information that is stored in a profile associated with that image set.

A profile may optionally contain other information in addition to the set of identifying information, such as identification of the camera(s) used to capture the associated image(s), or time and/or location information, for example. By including additional information in a profile, multiple profiles can be associated with the same person or object as each profile represents a separate occurrence of that person or object captured by the surveillance system.

Multiple Profiles can be Associated with an Object

Significantly, embodiments of the present invention allow multiple profiles to be associated with one person or object, where different profiles for the same object may include sets of identifying information that have different measurements for the same characteristic. For example, a first profile may contain a feature set for a particular person based on a first view of the person, and therefore reflect different characteristics than the feature set in a second profile for the same person taken under different conditions.

Figure 6:
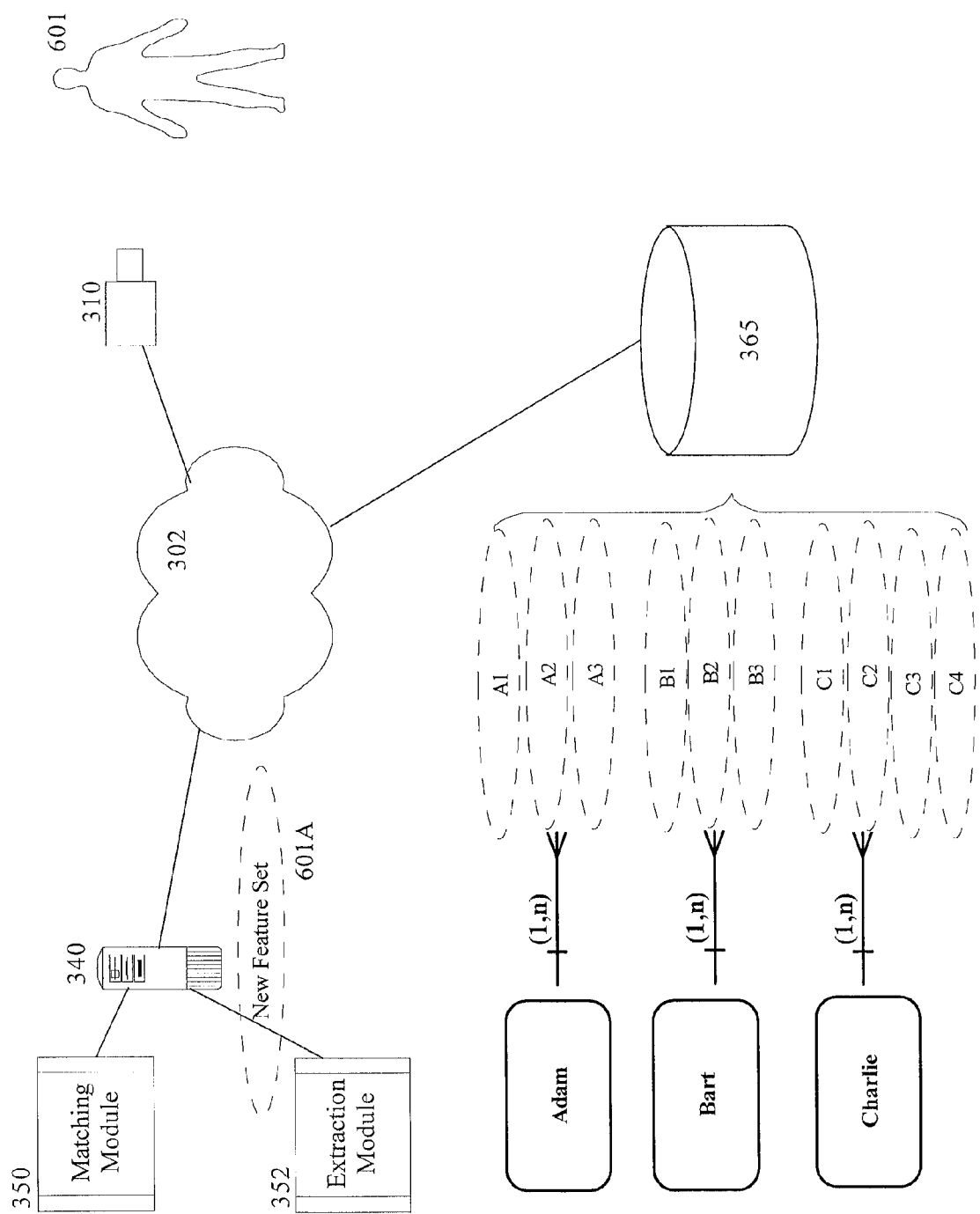
FIG. 6 is a diagram illustrating one example of the relationship between feature sets and known persons.

FIG. 6 illustrates this concept. In the example shown in FIG. 6, each person has a one-to-many relationship with stored profiles. Specifically, each person may have many profiles, but each profile can only be associated with one person.

In the example system of FIG. 6, a profile database in storage unit 360 contains ten profile records A1, A2, A3, B1, B2, B3, C1, C2, C3 and C4. Three people (Adam, Bart and Charlie) have previously been positively identified. These prior identifications are reflected in a database that associates a profile with a person. As shown, three profiles are associated with Adam (A1-A3), three profiles are associated with Bart (B1-B3) and four profiles are associated with Charlie (C1-C4).

Typically, each profile associated with a person reflects measurements produced in a different manner than the measurements of other profiles for the same person. For example, the different profiles for a particular person may have been derived from different sources. Thus, profiles A1, A2 and A3 associated with Adam may have been derived from three different images of Adam. Alternatively, profiles A1, A2 and A3 may have been derived from the same image of Adam, but may have used different algorithms to derive measurements of the same characteristics.

When a facial recognition system using the techniques described herein performs a matching or identification analysis, it is possible that multiple profiles for the same person will be determined to be potential matches. The occurrence of multiple profiles as likely matches in a matching analysis may be an indicator that the person associated with the multiple matching profiles is a "best match", as will be discussed in more detail below.

Known recognition systems are typically constrained to identifying a single person or object as a match for an object in a target image. Typically, such systems constrained to this "Yes/No" analysis calculate confidence scores between a target image and reference images. The person associated with the highest-ranked confidence score is identified as the person in the target image, so long as the confidence score for the match is greater than a minimum confidence threshold level. Otherwise, the system will indicate that no matches were found. The accuracy rates in these systems may be especially low. These systems will have a high rate of both misidentification and non-identification. A misidentification occurs when the wrong person is identified, and is sometimes called a "false positive", or "false acceptance." A non-identification occurs when a match is not found, although the person is in the system, and is sometimes called a "false negative" or "false rejection."

Embodiments of the present invention perform further analysis on the confidence scores, and determine a "best match", rather than simply determining a highest-ranked confidence score, resulting in significantly higher recognition rates.

In one embodiment, the confidence scores calculated by a matching module may be weighted using external information, and the highest weighted score chosen as the best match.

In another embodiment, as objects can be associated with multiple profiles, a weighted average of confidence scores may be calculated for each object, and the object with the highest weighted average chosen as the best match. In another embodiment, weighted averages of weighted confidence scores may used to determine the best match. Generally, the techniques described herein can use many types of information external to the confidence score generated by a matching module to weight the confidence scores or perform weighted averaging of confidence scores such that a more reliable identification can be made. For example, embodiments can use such information as physical location of an object within an image, time proximity of an object in an image to another object that has been positively identified, or organizational or group information related to potential matching candidate objects, to weight the confidence scores or perform weighted averaging. Any type of external information can be used, and the disclosed techniques are not limited to the examples given herein.

Object Recognition Process

Figure 4:
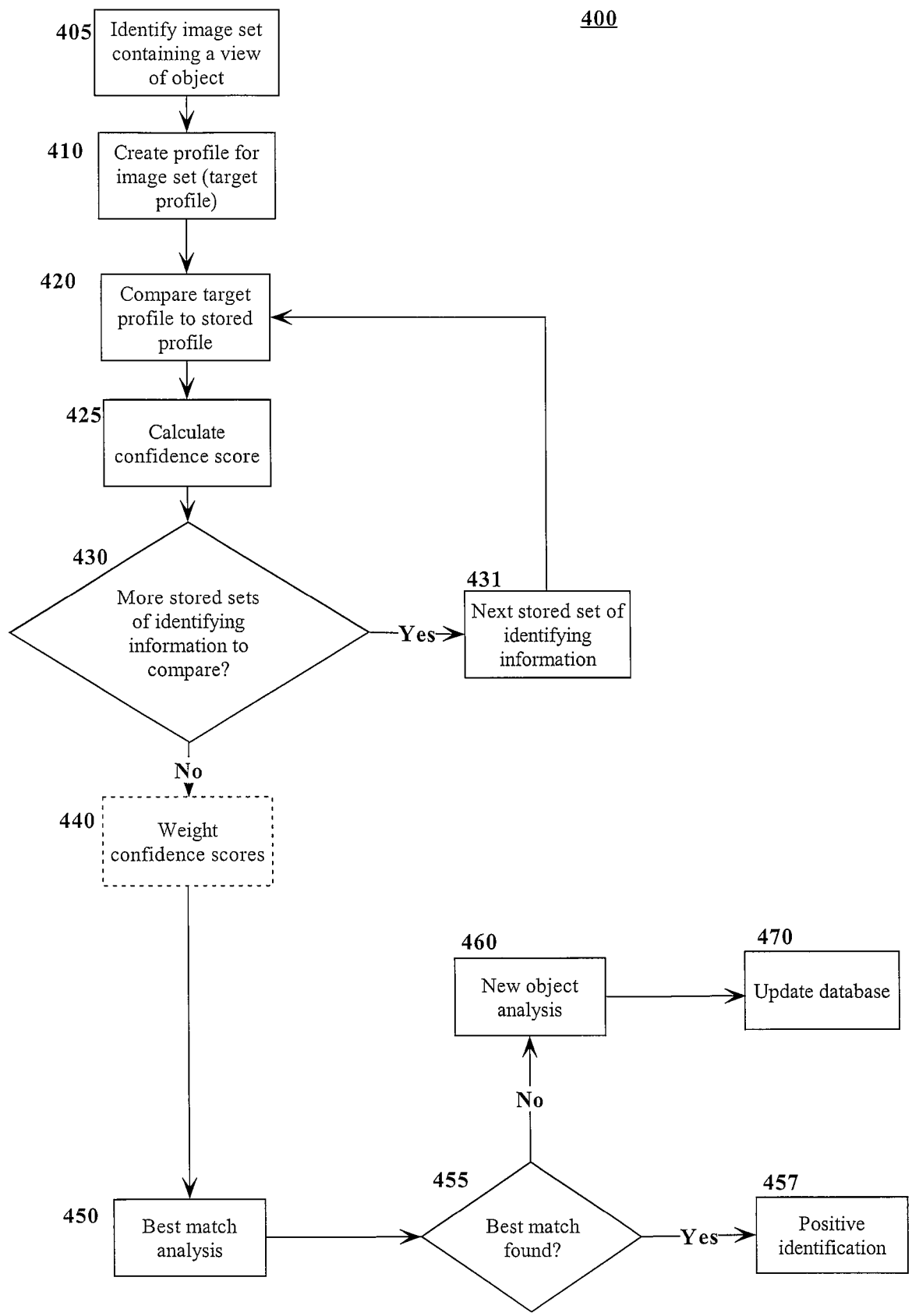
FIG. 4 is a flowchart illustrating one embodiment of a method for processing video data in a multi-camera image recognition system.

Referring to FIG. 4, a flowchart illustrating an object recognition process using weighted confidence scores or weighted averaging is depicted in accordance with one embodiment of the present invention. In one embodiment, process 400 is started when an event trigger occurs. For example, if implemented using the architecture disclosed in the co-pending Pipeline Application, one "trigger" that may start process 400 could be detection of a face in surveillance video by a "P2" face finding application that uses the P2 pipeline API.

The process begins at step 405 when an image set that contains a view of the object of interest is identified. The image set may include just a single image from a single camera. Alternatively, the image set may include multiple images from a single camera, or multiple images from multiple cameras. For example, an image set may be identified as a set of images related to a cluster event. The term "image set" will be used herein to include a set that comprises a single image as well as a set of multiple images.

As discussed, one common object recognition system is a facial recognition system. However, embodiments of the present invention may be used to recognize any type of object in an image set, and the image set identified at step 405 may contain a view of any type of object. When the techniques disclosed herein are used in a facial recognition system, the identified image set contains image(s) of a person's face as captured in frame(s) of video surveillance camera(s).

At step 410, a profile for the object in the image set is created. In this step, identifying information is extracted from the image set. In an embodiment of the present invention that uses the pipeline architecture of the Pipeline Application, third-party software can use the P2 and/or P3 APIs to extract a set of identifying information for an image set, and the created profile includes this extracted set of identifying information. Additional information, such as camera identification(s), date, time, etc., may also be included in the created profile.

The profile created in step 410, referred to herein as the "target profile", is compared against stored profiles. At step 420, the set of identifying information in the target profile ("target identifying information") is compared to a set of identifying information from a profile stored in a reference database. A confidence score that numerically represents the similarity between the target identifying information and the set of identifying information in the stored profile is calculated in step 425. In an embodiment of the present invention that uses the pipeline architecture of the Pipeline Application, third-party software can use the P2 and/or P3 APIs to make the comparison and generate a confidence score.

In a facial recognition system embodiment, the profile is compared to profiles stored in a database containing a plurality of stored profiles, and/or images. Typically, the stored profiles are associated with a known, identified person or object, but this is not required. For example, the comparison may compare the target profile to a stored profile that contains a feature set taken from earlier video capturing the face of an intruder who has not yet been identified.

Loop 430-431-420-425 is performed for each stored profile that is to be compared to the target profile. In particular, a confidence score is created for each comparison. In a preferred embodiment, a comparison is made with each stored profile, although it is possible that comparisons will only be made with a selected subset of the stored profiles.

While known facial recognition systems will simply return the top-ranked match when at least one confidence score exceeds a minimum threshold, the techniques described herein perform further analysis on the confidence scores to determine the best match.

Weighted Confidence Scores

After all comparisons have been made, in the embodiment shown in FIG. 4, the confidence scores generated by loop 420-425-430-431 may be weighted at optional step 440. Alternatively, the confidence scores may be weighted in the loop as comparison scores are generated. Step 440 is optional, as confidence scores do not have to be individually weighted.

There are many methods of weighting confidence scores contemplated, and several non-limiting examples are given herein. Generally, the weighting factor is derived from information external to the confidence scores themselves. For purposes of discussion, consider an example scenario in which a target profile is compared to five stored profiles, and five confidence scores are calculated, as shown in Table 1:

TABLE 1

| Stored Profile | Confidence Score |
|---|---|
| A | 90 |
| B | 85 |
| C | 80 |
| D | 75 |
| E | 70 |

If the confidence scores are used without weighting, profile A may be determined to be the closest match, and if the confidence score of 90 is greater than an object identification minimum threshold, the object in target profile may be identified as the object associated with profile A. As discussed above, error rates using this method can be quite high.

One example of weighting confidence scores such that a better match can be made is to weight the most recently created stored profiles higher, as characteristics of a person's face change over time, and more recent profiles may more closely reflect the person in the image. For example, profiles that are less than a week old may have a weighting factor of 1.0, profiles that are older than a week, but less than a month, may have a weighting factor of 0.9, and all other profiles are weighted by a factor 0.8. Assume, using the example from Table 1, that profile A is 3 weeks old, profile B is 1 hour old, profile C is 3 days old, profile D is 2 weeks old and profile E is 3 months old. Weighted confidence scores for this example are shown in Table 2:

TABLE 2

| Stored Profile | Confidence Score | Weight | Weighted Confidence Score |
|---|---|---|---|
| A | 90 | 0.9 | 81 |
| B | 85 | 1.0 | 85 |
| C | 80 | 1.0 | 80 |
| D | 75 | 0.9 | 67.5 |
| E | 70 | 0.8 | 56 |

In this example, even though profile A had the highest confidence score, profile B has the highest weighted confidence score, and may be selected as the closest matching profile for the target profile.

As another example, time proximity of the target image set to other image sets that contain positively identified objects may be used to weight the scores. That is, if a person is positively identified in video caught by Camera 2 at time 04:25:03, then it is more likely that the person identified in an image captured by Camera 2 at time 04:26:30 is the same person. Time proximity across cameras may also be used as a weighting factor. For example, if Camera 1 in the lobby recognizes a person at time 02:30:00, then it is likely that the person captured by Camera 3 in the hallway connected to the lobby at time 02:32:00 is the same person.

Best Match Analysis using Weighted Averaging

Returning to FIG. 4, after the confidence scores are weighted, if they are weighted, a Best Match analysis occurs at step 450. Significantly, instead of simply returning the single highest ranked match, as in other object recognition systems, embodiments of the present invention may analyze the individual confidence scores (weighted or unweighted), and/or the persons or objects associated with the profiles that were used to calculate the confidence scores, to intelligently determine a best match in Best Match Analysis step 450.

There are many methods contemplated for performing a Best Match Analysis, and several non-limiting examples are given herein. In particular, it is contemplated that an average or weighted average of confidence scores can be used to determine a best match.

As an object may have multiple stored profiles associated with it, the number of profiles in a short list of the highest ranked profiles associated with each object may be considered. Because objects can be associated with multiple profiles, the short list of likely matches will include the correct person or object as a likely candidate in the list much more frequently than if the system is constrained to just selecting a single highest-ranked profile.

One simple example of a best match analysis technique that illustrates this concept is to select the person or object who has the greatest number of profiles with a confidence score (weighted or unweighted) that is greater than a "best match" minimum confidence level. FIG. 6 illustrates this concept. As shown in FIG. 6, person 601 is spotted in front of camera 310 in a multi-camera surveillance system. The face of person 601 is identified in a video image by a face finding application, and profile 601A is created for person 601 that includes a feature set extracted from the image by extraction module 352. Comparisons are made by matching module 350 between the target profile (601A) and profiles in a reference database 365. In this example, ten profiles A1-A3, B1-B3 and C1-C4 are compared to target profile 601A, and a confidence score is calculated for each comparison by matching module 350.

Suppose confidence scores are calculated by matching module 350 as shown in Table 3:

TABLE 3

| Profile | Confidence Score |
|---|---|
| A1 | 40 |
| A2 | 45 |
| A3 | 10 |
| B1 | 95 |
| B2 | 30 |
| B3 | 50 |
| C1 | 94 |
| C2 | 93 |
| C3 | 89 |
| C4 | 91 |

In this example system, a best match minimum confidence level established by the system is 90. Therefore the profiles whose confidence scores that meet this minimum are B1:95, C1:94, C2:93, C4:91. In this example, the list of candidate objects includes Bart and Charlie. Even though there are four profiles that exceed the best match minimum threshold, only two objects (Bart and Charlie) are associated with the profiles in the list of likely matching profiles.

The profile with the highest confidence score is B1, associated with Bart. However, in this example, even though the confidence score of the match with Bart is higher than any match to Charlie, because there are three matches to Charlie that are greater than the best match minimum confidence level whereas there is only one match to Bart, the system may determine that Charlie is the best match. In an alternative embodiment, no minimum threshold is needed and a best match is determined using all profiles. That is, any object associated with a stored profile used to calculate a confidence score is a candidate object.

Alternatively, an average or weighted average may be determined. For example, for every object associated with a stored profile that has a matching confidence score over a certain threshold, all confidence scores for profiles associated with that object can be averaged. The object with the highest average confidence score may be determined the best match. In another alternative embodiment, there may be multiple matching modules that use different algorithms to return results, and all these results could be averaged together. Any type of weighted averaging may be used to determine a best match.

Alternatively, both scores and rankings can be used to calculate a weighted average for each candidate object, and the weighted average may be used to determine a best match. For purposes of discussion, consider an example scenario in which a target profile is compared to five stored profiles, five confidence scores are calculated, and each of the five stored profiles has been associated with (i.e., identified as) a person, as shown in Table 3:

TABLE 3

| Stored Profile | Confidence Score | Person |
|---|---|---|
| A | 95 | Adam |
| B | 85 | Bill |
| C | 80 | Bill |
| D | 75 | Adam |
| E | 70 | Bill |

There are many ways to calculate a weighted average for each candidate object (person) in Table 3 using confidence scores and/or rankings. Table 4 illustrates an example in which weights are assigned according to rank:

TABLE 4

| Stored Profile | Confidence Score | Person | Weight |
|---|---|---|---|
| A | 95 | Adam | 1 |
| B | 85 | Bill | 0.75 |
| C | 80 | Bill | 0.5 |
| D | 75 | Adam | 0.25 |
| E | 70 | Bill | 0.125 |

One technique is to add the weights for each candidate object, and not use the actual confidence scores. Using this technique, candidate object Adam would have a weighted average score of 1+0.25=1.25. Bill would have a weighted average score of 0.75+0.5+0.125=1.375. Using this example technique, Bill may be determined to be the best match.

Alternatively, the ranking weights could be used as multiplying factors. Using this technique, Adam would have a weighted average score of [(95*1)+(75*0.25)], or 113.75. Bill would have a weighted average score of [(85*0.75)+(80*0.5)+(70*0.125)], or 112.5. Using this technique, Adam may be determined to be the best match instead of Bill.

Using External Information in Best Match Analysis

In addition, Best Match Analysis 450 may perform analysis using information external to the confidence scores and rankings. For example, the time that a candidate object was last identified by the surveillance system may be considered in the analysis. The external information is used to weight the averages of candidate objects.

As another example, organizational or other types of information associated with candidate objects may be factored into the analysis. For example, consider a facial recognition system installed at a secure office building that is connected to a system that stores information about the organization that occupies the building. In this example, work shifts for each potential candidate for the person in the image set may be looked up. A person who is scheduled to be in the building at the time the image set was captured may be considered a better match than a person who is not scheduled to work that shift, or who is scheduled to be on vacation. As another example, the authorized and/or likely locations for a person may be looked up. For example, whether a candidate works on the loading dock can be used when determining whether a target image taken at the loading dock is more likely to be that candidate. As another example, candidates who are identified as executives may be better matches for a person captured by an executive suite camera. The proximity of the person in the image set to other members of the same department may also be considered in the best match analysis.

As another example, a facial recognition system implemented using the techniques of the present invention may be connected to an access control system. In this case, the identification of a person as reported by an access control system can be used to weight the averages and determine a best match.

Any method of incorporating external information into the weights used to determine a best match may be used. In addition, various combinations of external information may also be used to weight the average, as well as combinations of external information, ranking and weighted confidence scores, as discussed above.

New Object Analysis

Returning to the embodiment shown in FIG. 4, if a best match cannot be determined, then New Object Analysis is performed on the image set in step 460. Using the example above, a configurable best match minimum confidence level may be set. If none of the weighted confidence scores is greater than this minimum confidence level, then it may be determined that no matches were found at step 455, and the process continues to the New Object Analysis step of 460.

Otherwise, the object identified by the Best Match Analysis is automatically identified as the object in the image by the system at step 457. In one embodiment, when an identification is made by the system in step 457, the profile created in step 410 is discarded. In alternative embodiments, the target profiles, or selected ones of the target profiles, are saved, at least for a period of time if not indefinitely. In one embodiment, target profiles can also be re-generated at a later time in order to perform Best Match Analysis or New Object Analysis again when more stored profiles are available for comparison, and thus result in more accurate identifications.

Although the embodiment shown in FIG. 4 shows that the New Object Analysis only occurs if no best match is determined, in alternative embodiments, New Object Analysis can occur at any time. For example, a system may be implemented such that New Object Analysis is performed for every object for a certain time period.

In New Object Analysis 460, an expert user can enroll a new user or correct/confirm a best match determination made by Best Match Analysis 450. Although FIG. 4 shows that expert review is only taken if no best match is found, in alternative embodiments, an expert user may review all identifications made by the system. That is, New Object Analysis may be used by an Expert User to override an incorrect identification made by the system.

New Object Analysis 460 can be performed at the time it is determined that an Expert User is needed to make the match. Alternatively, New Object Analysis 460 can be performed at a later time, wherein the images that require an Expert User for identification are queued up for the Expert User(s).

Figure 5:
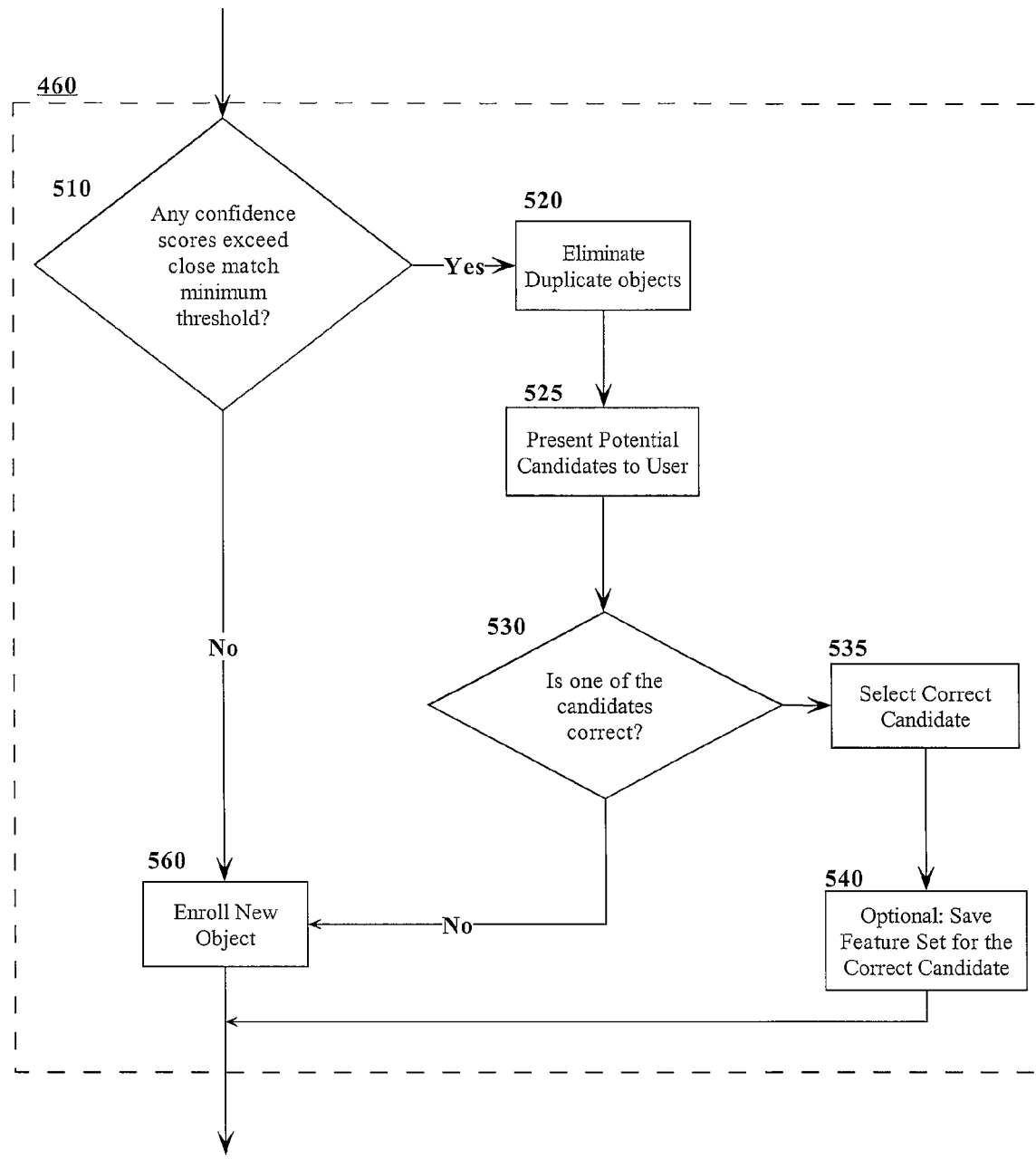
FIG. 5 is a flowchart illustrating one embodiment of a method for performing New Object Analysis.

FIG. 5 illustrates one embodiment of New Object Analysis 460. As shown, first it is determined at step 510 whether or not there were any matches that exceeded a minimum "close match" confidence threshold. If no matches exceed the close match confidence threshold, then the system assumes that the unidentified object in the image is an object currently unknown to the system.

The close match threshold is typically lower than the best match confidence threshold used in the Best Match Analysis, discussed above, although in one embodiment, the same threshold configuration may be used for each process. Alternatively, a close match minimum threshold may not be set at all, and the process always continues directly to step 520.

In the embodiment shown in FIG. 5, if it is determined at step 510 that there was at least one profile whose confidence score exceeded the close match minimum confidence threshold, the system assumes that the unidentified object in the image set is an object associated with one of the matches that exceeds the threshold. In this case, the process continues to step 520. Because multiple profiles can be stored for a single object, and therefore a ranked list of matches returned at step 440 can include multiple profiles that are associated with the same object, at step 520, the list of matches is examined to eliminate duplicate objects in the list. That is, a list of candidate objects is determined.

For example, suppose three confidence scores exceed the close match minimum threshold of 85—Art with a first score of 88 corresponding to a first profile associated with Art, and a second score of 91 corresponding to a second profile associated with Art, and Bert with a score of 93 for the only profile associated with Bert—then the list of candidate objects includes Art and Bert, and one of the instances of Art may be removed from the list.

At step 525 each candidate object determined in step 520 is presented as a possible candidate to the Expert User. In one embodiment, the surveillance system image identified at step 405 is shown to the Expert User along with one of the stored images associated with the candidate. In the example given above, the Expert User may be presented with the identified surveillance system image and a single image of Art and a single image of Bert. Alternatively, the Expert User may be presented with a video clip from which the images were obtained, or other associated video clips.

The Expert User determines whether the object in the identified image is one of the candidates. If the object is one of the candidates, the Expert User confirms this as a positive identification. The system will then either save the profile created at step 410, adding it as a new profile associated with the person, or discard the profile.

The decision of whether to save or discard the new profile can be made in a number of ways. The Expert User may be asked to manually confirm that the profile should be saved. Alternatively, the system may calculate the number of profiles that have already been saved for an object and discard the new profile if the number of profiles exceeds a certain number. Alternatively, the new profile may be saved, while an older profile is discarded, in order to maintain a consistent number of profiles for a person. In yet another alternative, the confidence score may be used as a determining factor in whether or not to save the profile. Many alternatives will be apparent to those skilled in the art.

In this process, the Expert User views the image of the object as captured in the surveillance video, and provides a name of the person and/or other information that identifies the object to the system. The system stores the object identifying information in a database. In addition, the profile created in step 410 and, optionally, an image of the object acquired by the surveillance system (such as an image from the image set identified in step 405) are saved in appropriate databases and associated with the object identifying information. Any method that saves the profile extracted in step 410 and associates it with a person or object can be used.

It is possible that the Expert User will not be able to identify the person or object in the video surveillance image identified in step 405. In this case, the profile could be discarded. Alternatively, the video clip and/or image acquired by the surveillance system and profile extracted for that image could be stored as an "unidentified" person or object. In this case, the person or object could be identified at a later time when more information is available, or flagged as a person of interest. In addition, the Expert User may be allowed to match the profile with another object in the database that was not in the list of candidate objects.

Multiple profiles associated with a single object improve the recognition accuracy rate. However, it may be impossible or impractical to save every profile associated with an object. Therefore, embodiments of the present invention will discard certain profiles in order to minimize the number of profiles saved per object. Profiles are typically saved only if they add value. For example, if a new profile has nearly identical measurements to an existing profile, then one of the two profiles may be discarded. However, if a new profile has significantly different measurements than the measurements in all previously existing profiles of the same object, then the new profile may be retained.

Furthermore, in alternative embodiments, the Expert User does not have to be a human. For instance, objects can be recognized using "expert" identification techniques. Such expert identification techniques may be too computationally expensive to be practical for the initial identification operation. While it may be impractical to invoke such techniques every time an identification operation is performed, it may be practical to invoke such techniques for the relative fewer situations in which the initial identification operation fails to identify the object of an image. In one embodiment, feedback from the expert user's identifications is used to "train" the system.

In addition, prior Expert User identifications or corrections to identifications made by the system can be used as a factor in the best match analysis to improve recognition. For example, prior Expert User corrections can be used to weight confidence scores, or as a factor when determining a weighted average in Best Match Analysis.

For example, a running score of correct and incorrect matches made from each stored profile may be kept. Any future matches using that profile may then be weighted accordingly. Furthermore, if the percentage of incorrect matches associated with a particular profile is determined to be too high, the profile may be "pruned" from the set of stored profiles. Likewise, a profile that is associated with a high correct identification rate may be weighted higher in the Best Match Analysis.

Embodiments of the present invention allow for reliable face recognition technology in an everyday type of environment, such as a surveillance system in an office building. Over time, multiple profiles are confirmed for a single person, thereby providing for higher accuracy rates as the system is used. The more samples (i.e., profiles) there are associated with a person, the more likely that the system will correctly identify people. By going through the above described process, the system is "trained" to more accurately identify people.

General Computer System

Figure 2:
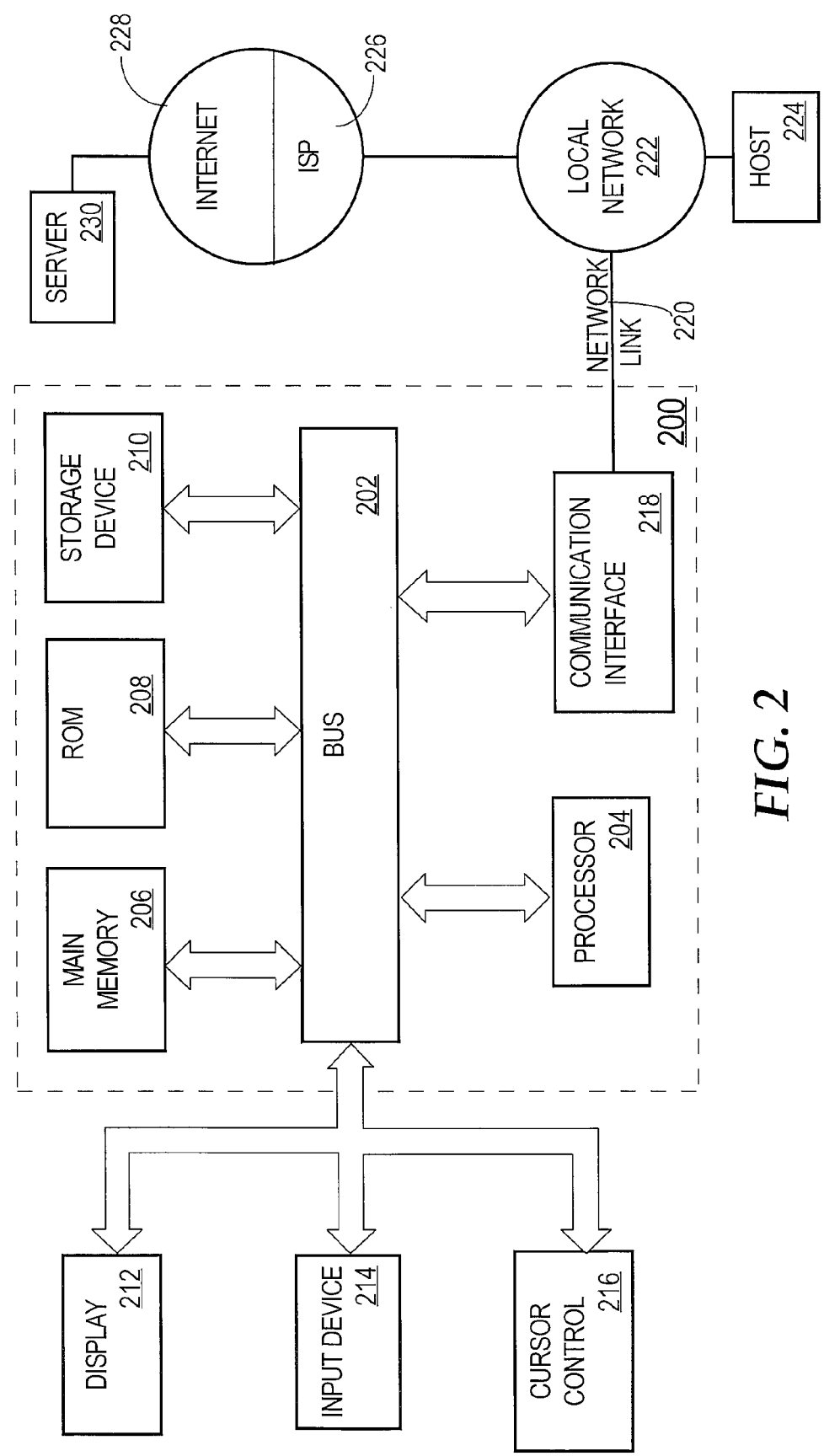
FIG. 2 is a block diagram that illustrates a computer system upon which an embodiment of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for maintaining associations between profiles and objects in an object recognition system, wherein a profile comprises a set of identifying information extracted from an image set associated with the profile, comprising the computer-implemented steps of:
   receiving a first image set;
   generating a stored profile based on the first image set;
   causing to be displayed, to a user, first data that identifies one or more objects that are automatically determined by the object recognition system to be possible matches to the stored profile;
   wherein the one or more objects includes a particular object that is associated with a particular stored profile;
   after the first data is displayed to the user, receiving, from the user, feedback that indicates that the particular object does not match the stored profile;
   in response to receiving the feedback from the user, updating a running score that is (a) maintained for the particular stored profile and (b) based on how often the object recognition system identified the particular object as a possible match but a user indicated the particular object was not a match;
   receiving a second image set;
   generating a second stored profile based on the second image set;
   determining a confidence score in a subsequent possible match that involves the particular stored profile and the second stored profile;
   weighting the confidence score based, at least in part, on the running score;

causing to be displayed, to a user, second data that identifies one or more second objects that are automatically determined by the object recognition system to be possible matches to the second stored profile, wherein the object recognition system determines whether to include the particular object in the one or more second objects based on the weighted confidence score;

wherein the method is performed by one or more computing devices.

2. The method of claim 1, wherein the objects comprise people and a set of identifying information comprises a facial feature set.

3. A method for maintaining associations between profiles and objects in an object recognition system, wherein a profile comprises a set of identifying information extracted from an image set associated with the profile, comprising the computer-implemented steps of:

receiving a particular image set;
generating a stored profile based on the particular image set;
causing to be displayed, to a user, a list of identities of one or more objects that are automatically determined to be possible matches to the stored profile;
receiving, from the user, feedback that indicates that a particular object of the one or more objects is not a possible match;
in response to receiving the feedback, updating a possible match score that is (a) associated with a particular stored profile of the particular object and (b) based on how often the object recognition system identified the particular stored profile as a possible match but a user indicated the particular stored profile as not a possible match;
determining a confidence score in a subsequent possible match that involves the particular stored profile;
weighting the confidence score based, at least in part, on the possible match score;
receiving a first image set;
generating a first stored profile based on the first image set;
receiving a second image set;
generating a second stored profile based on the second image set;
comparing the second stored profile with the first stored profile to generate a second confidence score;
determining whether the second confidence score satisfies one or more criteria;
in response to determining that the second confidence score satisfies the one or more criteria, causing to be displayed, to a second user, a second list of identities of one or more second objects that includes a first object and the second image set that is associated with the second stored profile;
receiving, from the second user, feedback that indicates that the first stored profile and the second stored profile are profiles of the same object; and
storing confirmation information that indicates that the second stored profile is of the first object;
wherein the method is performed by one or more computing devices.

4. The method of claim 1, wherein:
the one or more objects are a plurality of objects that includes the particular object and a second object that is different than the particular object;
the feedback further indicates that the stored profile is of the second object.

5. The method of claim 1, further comprising the computer-implemented steps of:

receiving a new image set;
extracting a first set of identifying information from the new image set;
creating a new profile that includes the first set of identifying information;
providing the new image set to the user;
receiving, from the user, second feedback that indicates a first object that should be associated with the new profile; and
creating a new association between the new profile and the first object.

6. The method of claim 5, wherein:
the step of providing the new image set additionally comprises providing a list of potential object identifications for the new profile; and
the step of receiving the second feedback comprises receiving a choice of one object from the list.

7. The method of claim 5, wherein:
the second feedback indicates that another object should be created; and
the step of creating a new association comprises creating a new object and creating the new association between the new profile and the new object.

8. The method of claim 1, further comprising:
comparing the stored profile with the particular stored profile to generate a second confidence score;
determining whether the second confidence score satisfies one or more criteria;
wherein causing the first data to be displayed is performed in response to determining that the second confidence score satisfies the one or more criteria.

9. The method of claim 8, wherein the one or more criteria includes at least that the second confidence score does not exceed a particular threshold.

10. The method of claim 8, wherein the one or more criteria includes at least that the second confidence score does not exceed a first threshold and does exceed a second threshold that is different than the first threshold.

11. The method of claim 1, wherein:
causing the second data to be displayed comprises causing the second image set that is associated with the second stored profile to be displayed.

12. The method of claim 1, further comprising:
receiving a third image set;
generating a third stored profile based on the third image set;
comparing the third stored profile with the particular stored profile to generate a second confidence score;
determining whether the second confidence score satisfies one or more criteria;
in response to determining that the second confidence score satisfies the one or more criteria, providing the third image set that is associated with the third stored profile and a particular image set that is associated with the particular stored profile to an object identification process that is more computationally expensive than the one or more processes that perform the steps of comparing and determining.

13. The method of claim 8, wherein the one or more criteria includes at least that the second confidence score exceeds a particular threshold.

14. The method of claim 1, further comprising:
after generating the stored profile and prior to receiving the feedback, causing the image set to be displayed.

15. The method of claim 14, further comprising, causing a particular image set upon which the particular stored profile is based to be displayed concurrently with the image set.

16. The method of claim 1, further comprising:
receiving a third image set;
generating a third stored profile based on the third image set;
causing to be displayed, to a second user, a second list of identities of one or more third objects that are automatically determined to be possible matches to the third stored profile;
receiving, from the second user, second feedback that indicates that a first object of the one or more third objects matches an object of the third stored profile;
in response to receiving the second feedback, updating a first possible match score that is (a) associated with a first stored profile of the first object and (b) based on how often the object recognition system identified the first stored profile as a possible match and a user indicated the first stored profile as a match;
determining a second confidence score in a subsequent possible match that involves the first stored profile;
weighting the second confidence score based, at least in part, on the first possible match score.

17. The method of claim 1, further comprising:
determining, based on the running score, whether to remove the particular stored profile from a set of stored profiles.

18. One or more non-transitory computer-readable media storing instructions for maintaining associations between profiles and objects in an object recognition system, wherein a profile comprises a set of identifying information extracted from an image set associated with the profile, wherein the instructions, when executed by one or more processors, cause:
receiving a first image set;
generating a stored profile based on the first image set;
wherein the one or more objects includes a particular object that is associated with a particular stored profile;
causing to be displayed, to a user, first data that identifies one or more objects that are automatically determined by the object recognition system to be possible matches to the stored profile;
after the first data is displayed to the user, receiving, from the user, feedback that indicates that the particular object does not match the stored profile;
in response to receiving the feedback from the user, updating a running score that is (a) maintained for the particular stored profile and (b) based on how often the object recognition system identified the particular object as a possible match but a user indicated the particular object was not a match;
receiving a second image set;
generating a second stored profile based on the second image set;
determining a confidence score in a subsequent possible match that involves the particular stored profile;
weighting the confidence score based, at least in part, on the possible match score;
causing to be displayed, to a user, second data that identifies one or more second objects that are automatically determined by the object recognition system to be possible matches to the second stored profile, wherein the object recognition system determines whether to include the particular object in the one or more second objects based on the weighted confidence score.

19. The one or more non-transitory computer-readable media of claim 18, wherein the objects comprises people and a set of identifying information comprises a facial feature set.

20. One or more non-transitory computer-readable media storing instructions for maintaining associations between profiles and objects in an object recognition system, wherein a profile comprises a set of identifying information extracted from an image set associated with the profile, wherein the instructions, when executed by one or more processors, cause:
receiving a particular image set;
generating a stored profile based on the particular image set;
causing to be displayed, to a user, a list of identities of one or more objects that are automatically determined to be possible matches to the stored profile;
receiving, from the user, feedback that indicates that a particular object of the one or more objects is not a possible match;
in response to receiving the feedback, updating a possible match score that is (a) associated with a particular stored profile of the particular object and (b) based on how often the object recognition system identified the particular stored profile as a possible match but a user indicated the particular stored profile as not a possible match;
determining a confidence score in a subsequent possible match that involves the particular stored profile;
weighting the confidence score based, at least in part, on the possible match score;
receiving a first image set;
generating a first stored profile based on the first image set;
receiving a second image set;
generating a second stored profile based on the second image set;
comparing the second stored profile with the first stored profile to generate a second confidence score;
determining whether the second confidence score satisfies one or more criteria;
in response to determining that the second confidence score satisfies the one or more criteria, causing to be displayed, to a second user, a second list of identities of one or more second objects that includes a first object and the second image set that is associated with the second stored profile;
receiving, from the second user, feedback that indicates that the first stored profile and the second stored profile are profiles of the same object; and
storing confirmation information that indicates that the second stored profile is of the first object.

21. The one or more non-transitory computer-readable media of claim 18, wherein:
the one or more objects are a plurality of objects that includes the particular object and a second object that is different than the particular object;
the feedback further indicates that the stored profile is of the second object.

22. The one or more non-transitory computer-readable media of claim 18, wherein the instructions, when executed by the one or more processors, further cause:
receiving a new image set;
extracting a first set of identifying information from the new image set;
creating a new profile that includes the first set of identifying information;
providing the new image set to the user;
receiving, from the user, second feedback that indicates a first object that should be associated with the new profile; and creating a new association between the new profile and the first object.

23. The one or more non-transitory computer-readable media of claim 22, wherein:
the step of providing the new image set additionally comprises providing a list of potential object identifications for the new profile; and
the step of receiving the second feedback comprises receiving a choice of one object from the list.

24. The one or more non-transitory computer-readable media of claim 22, wherein:
the second feedback indicates that another object should be created; and
the step of creating a new association comprises creating a new object and creating the new association between the new profile and the new object.

25. The one or more non-transitory computer-readable media of claim 18, wherein the instructions, when executed by the one or more processors, further cause:
comparing the stored profile with the particular stored profile to generate a second confidence score;
determining whether the second confidence score satisfies one or more criteria;
wherein causing the first data to be displayed is performed in response to determining that the second confidence score satisfies the one or more criteria.

26. The one or more non-transitory computer-readable media of claim 25, wherein the one or more criteria includes at least that the second confidence score exceeds a particular threshold.

27. The one or more non-transitory computer-readable media of claim 25, wherein the one or more criteria includes at least that the second confidence score does not exceed a particular threshold.

28. The one or more non-transitory computer-readable media of claim 25, wherein the one or more criteria includes at least that the second confidence score does not exceed a first threshold and does exceed a second threshold that is different than the first threshold.

29. The one or more non-transitory computer-readable media of claim 18, wherein:
causing the second data to be displayed comprises causing the second image set that is associated with the second stored profile to be displayed.

30. The one or more non-transitory computer-readable media of claim 18, wherein the instructions, when executed by the one or more processors, further cause:
receiving a third image set;
generating a third stored profile based on the third image set;
comparing the third stored profile with the particular stored profile to generate a second confidence score;
determining whether the second confidence score satisfies one or more criteria;
in response to determining that the second confidence score satisfies the one or more criteria, providing the third image set that is associated with the third stored profile and a particular image set that is associated with the particular stored profile to an object identification process that is more computationally expensive than the one or more processes that perform the steps of comparing and determining;
second confidence score satisfies the one or more criteria.

31. The one or more non-transitory computer-readable media of claim 18, wherein the instructions, when executed by the one or more processors, further cause:
after generating the stored profile and prior to receiving the feedback, causing the image set to be displayed.

32. The one or more non-transitory computer-readable media of claim 31, wherein the instructions, when executed by the one or more processors, further cause, causing a particular image set upon which the particular stored profile is based to be displayed concurrently with the image set.

33. The one or more non-transitory computer-readable media of claim 18, wherein the instructions, when executed by the one or more processors, further cause:
receiving a third image set;
generating a third stored profile based on the third image set;
causing to be displayed, to a second user, a second list of identities of one or more third objects that are automatically determined to be possible matches to the third stored profile;
receiving, from the second user, second feedback that indicates that a first object of the one or more third objects matches an object of the third stored profile;
in response to receiving the second feedback, updating a first possible match score that is (a) associated with a first stored profile of the first object and (b) based on how often the object recognition system identified the first stored profile as a possible match and a user indicated the first stored profile as a match;
determining a second confidence score in a subsequent possible match that involves the first stored profile;
weighting the second confidence score based, at least in part, on the first possible match score.

34. The one or more non-transitory computer-readable media of claim 18, wherein the instructions, when executed by the one or more processors, further cause:
determining, based on the running score, whether to remove the particular stored profile from a set of stored profiles.

* * * * *